INVENTOR
ERIC G. LAUE

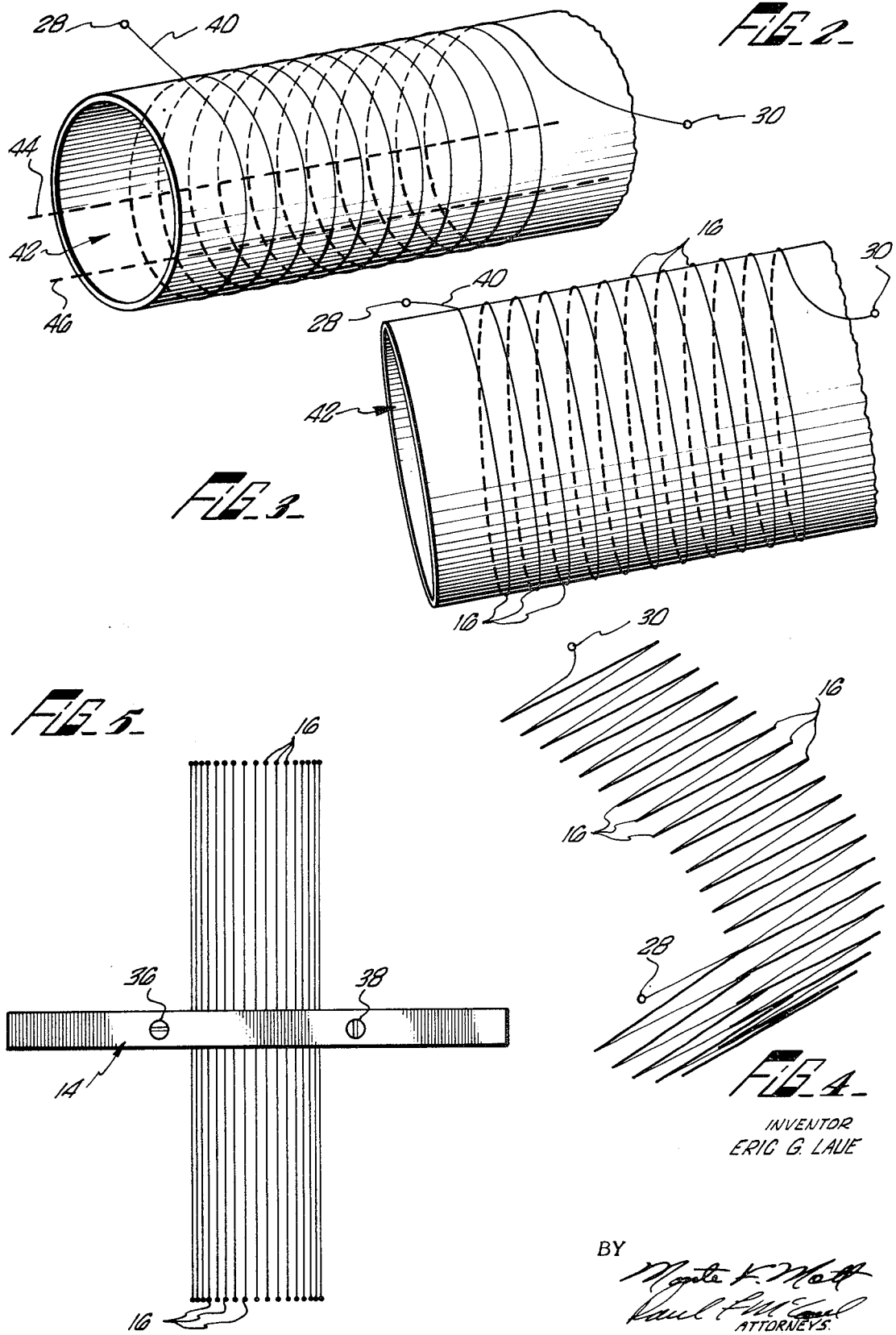

United States Patent Office 3,700,503
Patented Oct. 24, 1972

3,700,503
IRRADIANCE MEASURING DEVICE
James C. Fletcher, Administrator of the National Aeronautics and Space Administration, with respect to an invention of Eric G. Laue, San Marino, Calif.
Filed June 9, 1971, Ser. No. 151,413
Int. Cl. H01v 1/02
U.S. Cl. 136—224
8 Claims

ABSTRACT OF THE DISCLOSURE

A thermopile configured to resemble a pin cushion for enabling direct measurements of incident radiant energy, is disclosed. The thermopile includes a plurality of serially connected hemispherical arrays. A clamping shield separates the respective arrays. One thermocouple array is employed as a sensor to detect incident radiant energy while the other array serves as a thermal reference and is maintained at a reference temperature. Electrical signals developed across a pair of output terminals provide a quantitative indication of incident radiant energy.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

(1) Field of the invention

This invention generally relates to thermopiles that are useful for measuring temperatures, measuring radiant energy, and/or converting radiant energy to electric energy. More specifically, the present invention concerns a thermopile that is configured to enable direct measurements without the need for assumptions and calculations to compensate for the direction from which radiant energy is incident upon a sensor surface.

(2) Description of the prior art

A great number of different instruments have heretofore been used to make radiometric measurements of sun and sky irradiance. Typically, these instruments include a sensor having a planar configuration. Generally, such a configuration is used in consequence of the difficulty in fabricating sensors in some other configuration.

A flat sensor configuration has the attendant disadvantage of requiring that assumptions and calculations be made, to compensate for radiation not being incident on the sensor surface from a direction normal to the surface, in the process of obtaining measurements of "total normal irradiance." This is due to conventional flat surfaced sensors exhibiting maximum sensitivity to radiant energy arriving from directions normal to the surface of the sensor. Conversely, minimum sensitivity is exhibited to radiant energy arriving from directions that are parallel to the sensor surface while an intermediate sensitivity is exhibited to energy arriving from angles of incidence ranging between zero degrees (parallel) and ninety degrees (normal).

The use of such assumptions and calculations in arriving at a value for "total normal irradiance" naturally produces at least a modicum of error which would be avoided by providing a sensor having a sensing surface that does not exhibit varying sensitivity to radiation incident from different directions.

OBJECTS AND SUMMARY OF THE INVENTION

It is accordingly an object of the present invention to provide a sensor that will enable a direct measurement of "total normal irradiance" without the need for assumptions and calculations to compensate for different angles of incidence of radiant energy.

It is another object of the present invention to provide a thermopile including a multiplicity of thermocouples which are arranged about an imaginary spherical surface.

It is a further object of the present invention to provide a thermopile having a configuration that enables a direct output for energy incident from any of the directions included in a 2 pi steradians celestial expanse.

It is yet a further object of the invention to provide a technique for fabricating a thermopile having an array of thermocouples ararnged about spherical surfaces.

Briefly described, the present invention involves a thermopile including a multiplicity of serially connected thermocouples which are arranged about spherical surfaces and a technique for fabricating such a thermopile.

More particularly, the subject thermopile includes a plurality of serially connected thermocouples that are respectively formed with a metal wire having sections thereof appropriately plated with another metal. The thermocouples are alternately included in one of a pair of arrays shaped to essentially form a hemisphere. One array is used to sense incident radiant energy while the other array provides a temperature reference by being maintained at, for example, ambient temperature and compensating for changes thereof. A pair of clamping plates serve to retain the respective thermocouples of each array in position and to shield incident radiant energy from the reference array.

The technique for fabricating a thermopile involves winding or coiling an appropriate metal wire on a mandrel and plating alternate sections of the wire with an appropriate metal to form the desired thermocouples. The resulting thermocouples are serially connected. The coiled wire is then flattened either before or after removal from the mandrel such that thermocouple junctions are situated at opposite edges of the flattened coil. A conventional technique may be used to electrically insulate the respective wires of each thermocouple. The flattened coil may then be rolled, end to end and in a direction parallel to said opposite edges to produce a bundle wherein the thermocouple junctions are confined to the two ends of the bundle. The bundle of thermocouples is then clamped at a midsection. Finally the individual thermocouples are spacedly displaced to positions about an imaginary spherical surface to form a thermopile including a pair of essentially hemispherical thermocouple arrays.

The features that characterize the novelty of the present invention are set forth with particularity in the appended claims. Both the organization and manner of operation of the invention, as well as the attendant advantages and further objects thereof, may be best understood by reference to the following detailed description taken in conjunction with the accompanying drawings wherein like reference symbols designate like parts throughout the figures thereof.

BRIEF DESCRIPTION OF THE DRAWINGS

FIG. 2 is a schematic diagram illustrating a perspective view of a mandrel having a partially plated wire coiled thereon.

FIG. 3 is a schematic diagram illustrating a perspective view of the apparatus shown in FIG. 2 wherein the madnrel and the plated wire coiled thereon have been flattened.

FIG. 4 is a schematic diagram illustrating a perspective view of a flattened coil of wire in the initial stages of being rolled end to end to form a thermocouple bundle.

FIG. 5 is a schematic diagram illustrating a side view of a thermocouple bundle secured by a clamping shield.

DESCRIPTION OF THE PREFERRED EMBODIMENT

Figure 1:
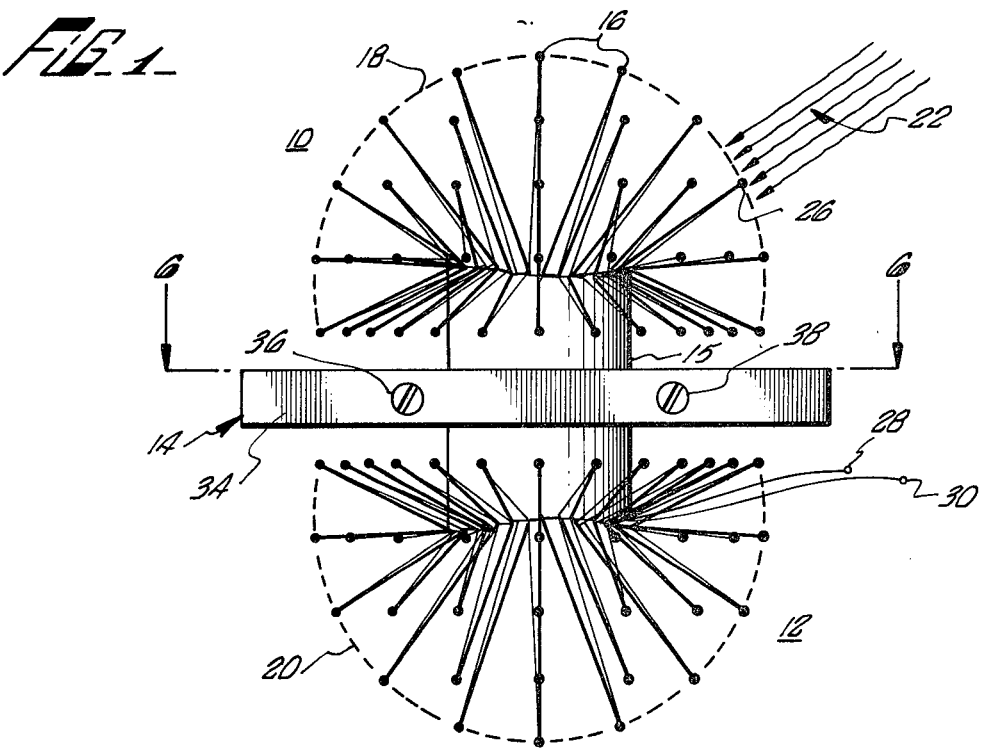
FIG. 1 is a schematic diagram illustrating a side view of a thermopile in accordance with the present invention.

Referring to FIG. 1, a thermopile in accordance with the present invention essentially includes a pair of thermocouple arrays 10 and 12 which are disposed on opposite sides of a clamping shield 14. Conventionally thermopiles are used to detect radiant energy and typically can include a number of thermocouples. A thermocouple generally consists of two dissimilar metallic elements that are joined together to form a junction across which an E.M.F. is produced when such junction is exposed to radiant energy. The magnitude of the E.M.F. is a function of the amount of incident radiant energy.

Each of the thermocouple arrays 10 and 12 includes a multiplicity of thermocouples 16 which are disposed about an imaginary spherical surface indicated by the dashed lines which have been labeled with reference numerals 18 and 20. This spherical arrangement allows incident radiant energy to be normal to a sensing array regardless of the angle of incidence. As illustrated, radiant energy symbolized by the wavy lines 22 will be normal to the imaginary spherical surface 18 in the vicinity of the thermocouple junction 26.

As is described in greater detail hereinafter, thermocouple junctions are alternately included in the respective arrays 18 and 20 and are serially coupled between a pair of output terminals 28 and 30. The output terminals 28 and 30 may be connected to any conventional recording, monitoring, or other utilization instrumentation to accomplish a desired purpose.

The clamping shield 14 may be provided with any appropriate configuration, such as a composite circular plate or rectangular plate, may be formed by a pair of half sections 32 and 34 which are appropriately secured such as with a pair of screws or bolts 36 and 38. The clamping shield 14 should be sufficiently sized to obscure radiant energy to be measured from the reference thermocouple array. Any appropriate material may be used for the clamping shield 14. For example, where a metal is employed, aluminum or the like, could be used as an inexpensive metal.

Operationally, a thermocouple is situated to have one of the thermocouple arrays 18 or 20 employed as a thermal reference by being maintained at a reference temperature, i.e., ambient temperature. The other thermocouple array is situated to have radiant energy to be sensed incident thereon. Radiant energy incident from any of the directions encompassed at least by 2 pi steradians will produce a direct measurement of the incident energy, assuming, of course, that the sensing thermocouple array is not obscured. Making an array slightly cylindrical such as by adjustment of the thermocouples closest to the clamping shield 14 is considered to enable better detection of radiant energy arriving from near-horizon directions.

Considering now the technique for fabricating a thermopile in accordance with the invention, reference is made to FIG. 2 of the drawings. A single wire 40 is shown wound about a generally cylindrical mandrel 42 which preferably has a circular transverse cross section. The coiled wire 40 is partially plated to form a multiplicity of thermocouple junctions. This may be accomplished in any number of manners that are well known in the prior art. For example, the wire 40 and the mandrel 42 may be partially immersed in a plating bath such that one half of each winding of the wire 40 is plated. To this end, the mandrel 42 and wire 40 could be longitudinally immersed to the extent illustrated by a pair of parallel broken lines 44 and 46 which longitudinally extend along opposite sides of the mandrel.

Typically, the wire 40 may be constantan (an alloy of forty percent (40%) nickel and sixty percent (60%) copper) and the plating may be copper. As shown in FIG. 2, the thickened portions 48 of the wire 40 would be copper plated while the remaining thinner portions would be unplated constantan. It is understood that any other known combination of dissimilar metals may be used to produce the thermocouples.

Following such plating it is apparent that a pair of thermocouple junctions 16 is produced for each winding of the wire 40 and that these thermocouple junctions 16 are serially connected such that the ends 28 and 30 of the wire 40 may serve as output terminals for a resulting thermopile.

The coil of plated wire 40 is then flattened. This flattening may be accomplished either after removal of the wire 40 from the mandrel 42, or by flattening the wire 40 and mandrel 42 at the same time and before separation of the mandrel 42 from the wire 40. Flattening of the coil of wire 40 is carried out such that the thermocouple junctions 16 are aligned along opposite edges of the flattened coil.

Figure 6:
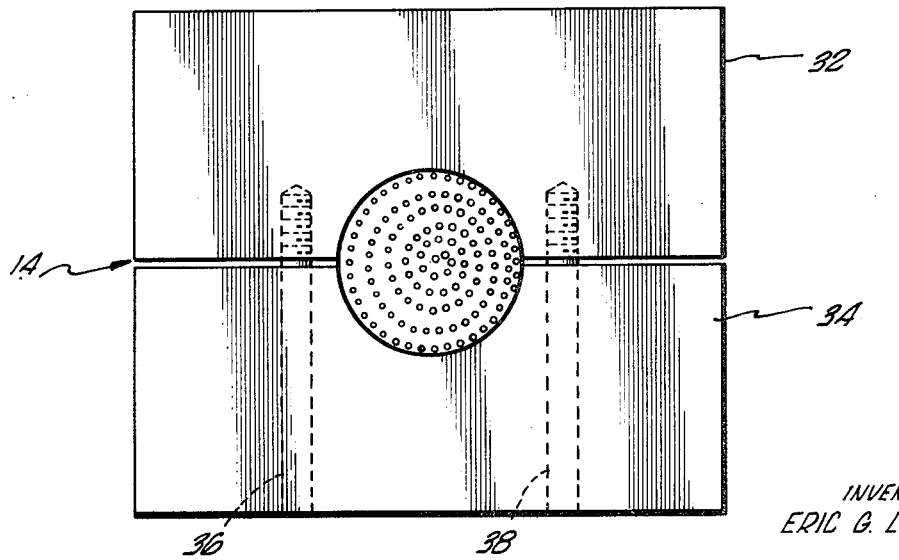
FIG. 6 is a schematic diagram illustrating a top view of the apparatus illustrated by FIG. 5.

At this point, the plated wire 40 may be appropriately insulated such as by being sprayed to have a coating of varnish, or the like. The flattened coil may then be rolled end over end to form a thermocouple bundle, as shown in FIG. 4, and subsequently clamped by a clamping shield 14, as illustrated by FIGS. 5 and 6. A sleeve of appropriate length may be placed in surrounding position about the thermocouple bundle prior to being finally constrained between the halves 32 and 34 of the clamping shield 14.

The final step in the fabrication of a thermopile is the displacing of the individual thermocouple junctions 16 to positions that are generally uniformly displaced about the desired imaginary spherical surface. Such displacement of the thermocouple junctions 16 may be accomplished in any appropriate manner such as by being bent with a person's fingers. Clearly, the greater the number of thermocouple junctions, the more dense will be the distribution of thermocouples in an array.

Serially coupling the respective thermocouples between the output terminals 28 and 30 serves to produce greater output voltages between the output terminals 28 and 30 for incident radiant energy. Where desired, greater output currents may be instead provided by connecting the respective thermocouples in parallel between the output terminals 28 and 30. It is apparent that such parallel connection may be accomplished, for example, by severing the connection between the individual thermocouples 16 shown in FIG. 2 and subsequently making a parallel electrical connection.

It is noted that the wires may be sprayed with a foam formulation or "spider web" thermally conductive material to permanently maintain the desired spacing of the thermocouples and to provide a hemispherical intercepting surface. The entire device may then be coated with a black surfacing material such as Parson's Black to produce minimum reflectance or maximum absorbency.

It is estimated that the basic sensitivity of a thermocouple device of the suggested configuration will be one sixth (⅙) that of a conventional flat plate thermopile having the same number of junctions disposed normal to the irradiance input. However, the device will have the advantage that the output will be a direct indication of total irradiance. This will eliminate the necessity for making assumptions and calculations to arrive at an estimation which represents the total energy arriving at the point of detection on the earth's surface.

From the foregoing discussion, it is now apparent that a thermopile including a pair of hemispherically shaped thermocouple arrays is provided by the present invention and that such thermopile will enable a direct measurement of incident radiant energy in units of "total normal irradiance" without the need for assumptions, or calculations to compensate for varying angles of incidence, such thermopile being insensitive to variations in the direction from which energy is incident.

What is claimed is:

1. A thermopile comprising
    a pair of thermocouple arrays each including a plurality of thermocouples having the junctions thereof positioned on and distributed about an imaginary spherical surface; and
    clamping means for constraining said thermocouples in preselected positions to form said arrays.

2. The thermopile defined by claim 1 wherein said thermocouples are serially connected and are successively included in a different one of said pair of thermocouple arrays.

3. The thermopile defined by claim 1 wherein said thermocouples are of the plated type having a junction formed with a first metal plated onto a dissimilar second metal.

4. The thermopile defined by claim 1 wherein said clamping means includes a pair of half sections between which said thermocouples extend, said clamping means extending in a plane position between said pair of arrays and obscuring said arrays from each other.

5. The thermopile defined by claim 4 wherein said thermocouples are serially connected and are successively included in a different one of said pair of thermocouple arrays.

6. The thermopile defined by claim 5 wherein said thermocouples are of the plated type having a junction formed with a first metal plated onto a dissimilar second metal.

7. A method for making a thermopile comprising the steps of:
    bundling a plurality of serially connected thermocouples to have the junction of successive thermocouples extending in opposite directions;
    clamping said bundle of thermocouples about a midsection thereof; and
    distributing said thermocouple junctions at each end about an imaginary spherical surface to form a pair of thermocouple arrays.

8. The method defined by claim 7 wherein the step of bundling includes the steps of:
    coiling a length of metal wire to form a coil including a plurality of equally sized windings and having a cylindrical configuration;
    plating one half of each said winding with a dissimilar metal to have said wire include a succession of plated and unplated wire segments of equal lengths;
    flattening said coil by creasing said windings at the junctions of dissimilar metals; and
    gathering the segments of wire to form a bundle of thermocouples.

References Cited

UNITED STATES PATENTS

| | | | |
|---|---|---|---|
| 3,348,978 | 10/1967 | Teague | 136—233 |
| 3,382,108 | 5/1968 | Wilkins | 136—226 |

CARL D. QUARFORTH, Primary Examiner

H. E. BEHREND, Assistant Examiner

U.S. Cl. X.R.

136—201, 213, 226; 250—83 R